(12) United States Patent
Morgan et al.

(10) Patent No.: US 11,373,377 B2
(45) Date of Patent: Jun. 28, 2022

(54) COMPUTATIONALLY EFFICIENT MODEL SELECTION

(71) Applicant: Apple Inc., Cupertino, CA (US)

(72) Inventors: Bo Morgan, Emerald Hills, CA (US); Mark E. Drummond, Palo Alto, CA (US); Peter Meier, Los Gatos, CA (US); Cameron J. Dunn, Los Angeles, CA (US); John Christopher Russell, Playa del Rey, CA (US); Siva Chandra Mouli Sivapurapu, Santa Clara, CA (US); Ian M. Richter, Los Angeles, CA (US)

(*) Notice: Subject to any disclaimer, the term of this patent is extended or adjusted under 35 U.S.C. 154(b) by 0 days.

(21) Appl. No.: 17/203,393

(22) Filed: Mar. 16, 2021

(65) Prior Publication Data

US 2021/0201594 A1 Jul. 1, 2021

Related U.S. Application Data

(63) Continuation of application No. PCT/US2019/052587, filed on Sep. 24, 2019.

(60) Provisional application No. 62/738,066, filed on Sep. 28, 2018.

(51) Int. Cl.
*G06T 19/00* (2011.01)
*A63F 13/55* (2014.01)
*G06F 40/14* (2020.01)
*G06F 3/01* (2006.01)

(52) U.S. Cl.
CPC ............ *G06T 19/006* (2013.01); *A63F 13/55* (2014.09); *G06F 3/011* (2013.01); *G06F 40/14* (2020.01)

(58) Field of Classification Search
CPC ........ G06T 19/006; A63F 13/55; G06F 40/14; G06F 3/011
See application file for complete search history.

(56) References Cited

U.S. PATENT DOCUMENTS

| | | | |
|---|---|---|---|
| 2010/0094786 A1* | 4/2010 | Gupta | G06N 3/006 706/12 |
| 2010/0100248 A1* | 4/2010 | Minto | G05B 17/02 700/287 |
| 2016/0267720 A1 | 9/2016 | Mandella et al. | |
| 2021/0201108 A1* | 7/2021 | Morgan | G06T 19/006 |
| 2021/0374615 A1* | 12/2021 | Drummond | G06T 19/006 |

OTHER PUBLICATIONS

IPPI First Examination Report dated Mar. 8, 2022, Indian Patent Application No. 202117012582, pp. 1-7.

(Continued)

*Primary Examiner* — Chong Wu
(74) *Attorney, Agent, or Firm* — Fernando & Partners, LLP

(57) ABSTRACT

In various implementations, a device surveys a scene and presents, within the scene, a extended reality (XR) environment including one or more assets that evolve over time (e.g., change location or age). Modeling such an XR environment at various timescales can be computationally intensive, particularly when modeling the XR environment over larger timescales. Accordingly, in various implementations, different models are used to determine the environment state of the XR environment when presenting the XR environment at different timescales.

20 Claims, 17 Drawing Sheets

(56) References Cited

OTHER PUBLICATIONS

International Search Report and Written Opinion dated Dec. 9, 2019, International Application No. PCT/US2019/052587, pp. 1-14.
ChemEngTutor, "Simulink Basics Part 7—Changing Model Configuration Parameters," YouTube, Aug. 9, 2016, Retrieved from the Internet on Dec. 2, 2019: https://www.youtube.com/watch?v=k1yOu-64ITw, 1 Page.
Martin Schreiber et al., "A Decentralized Parallelization-in-Time Approach with Parareal," arXiv preprint arXiv:1506.05157, 2015, pp. 1-6.

* cited by examiner

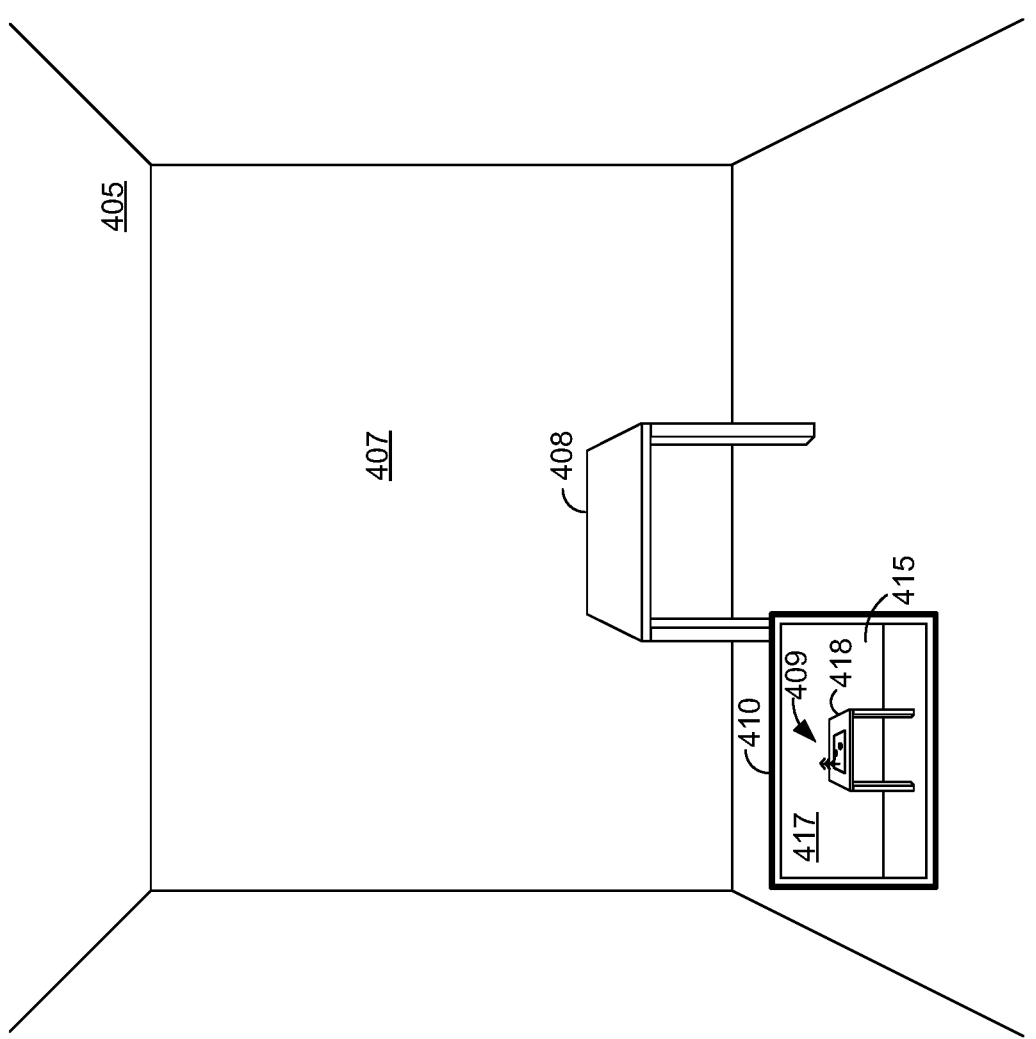

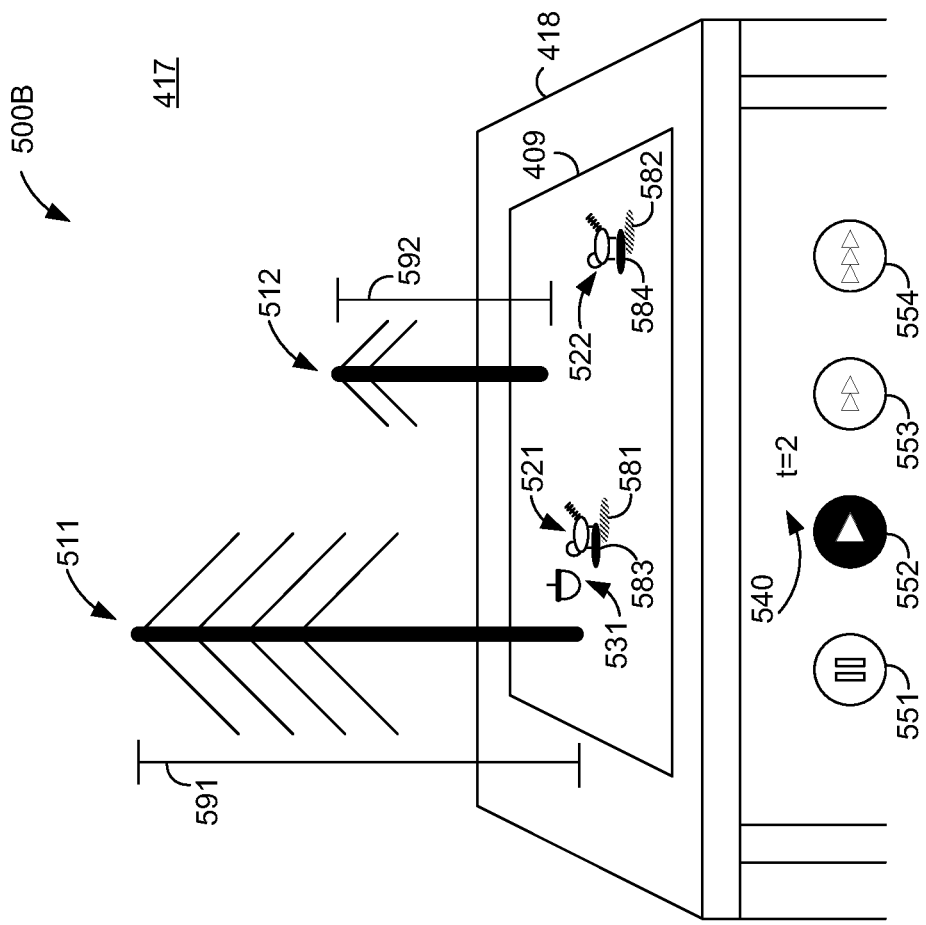

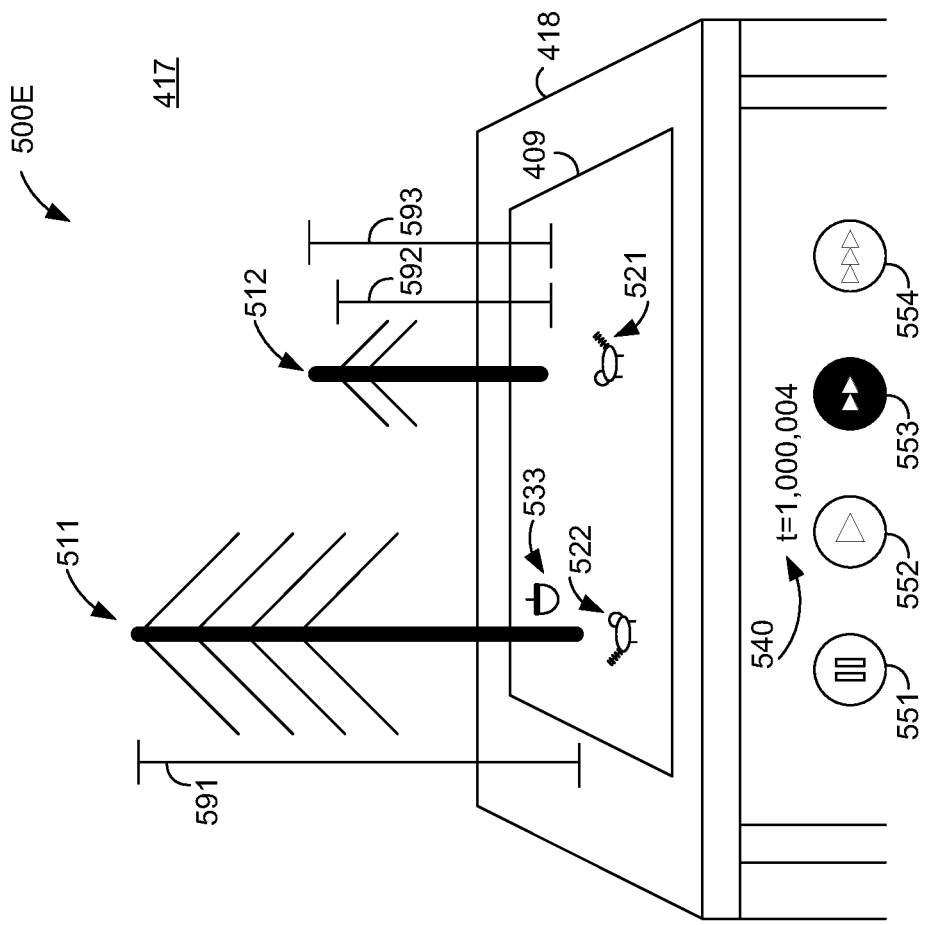

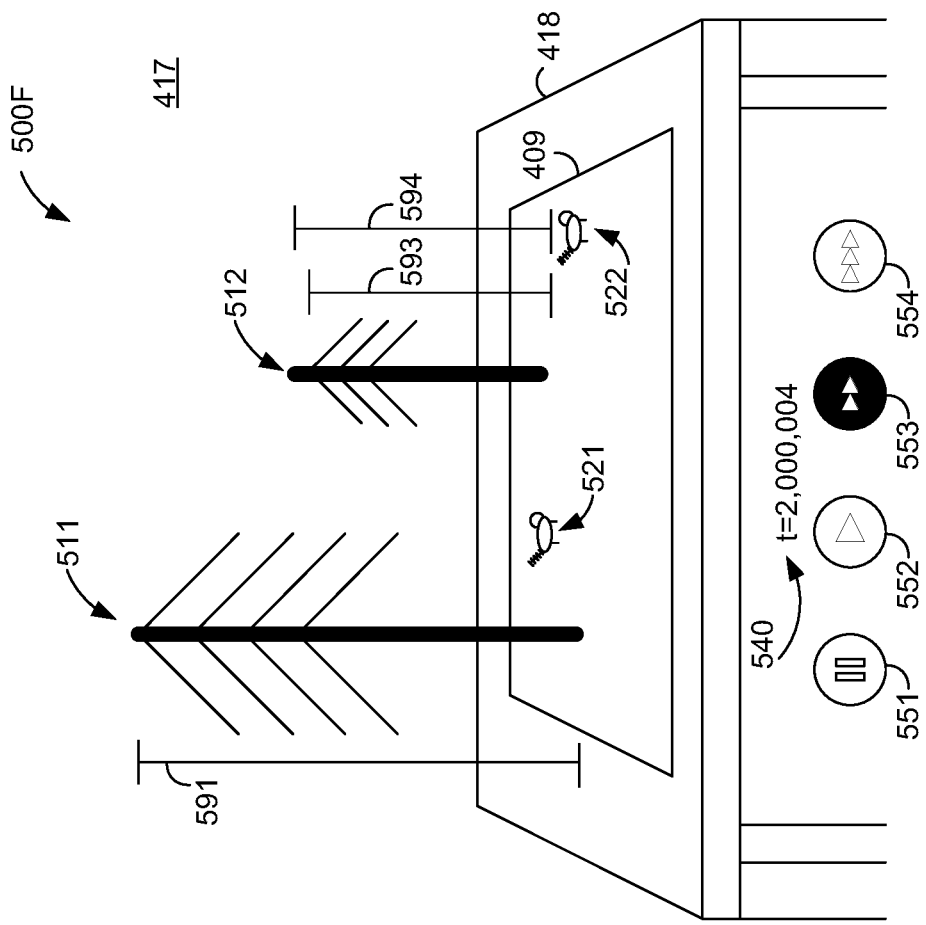

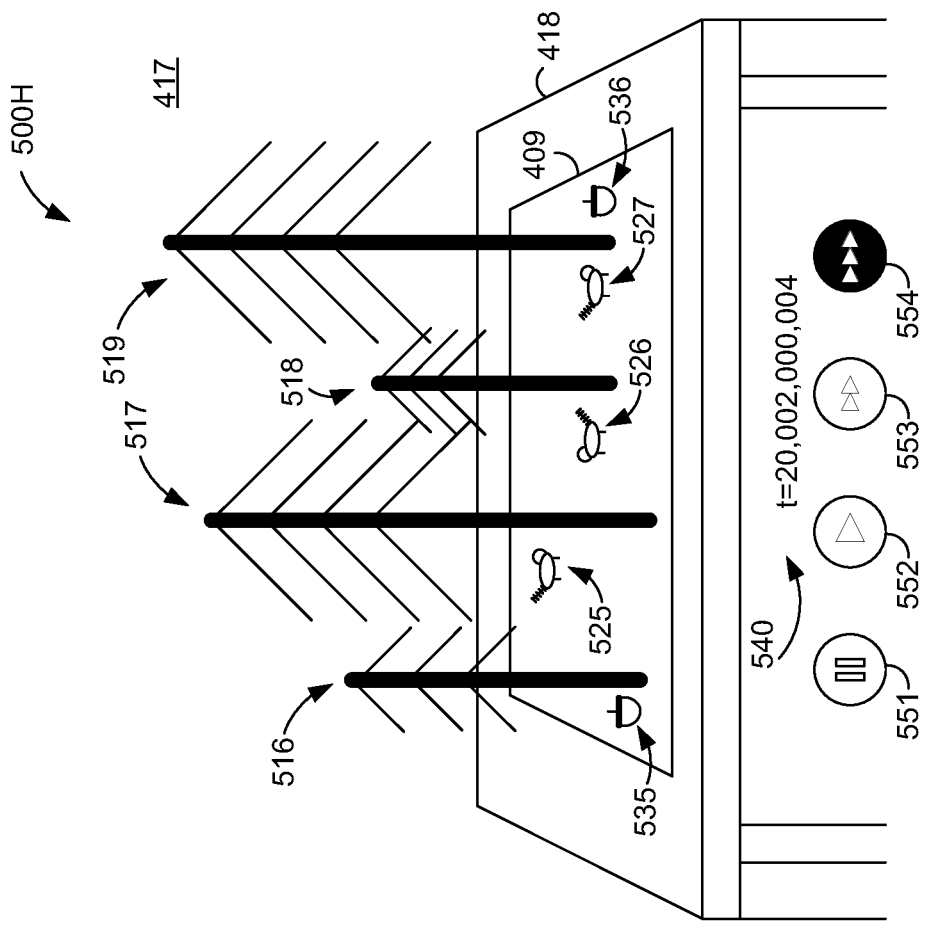

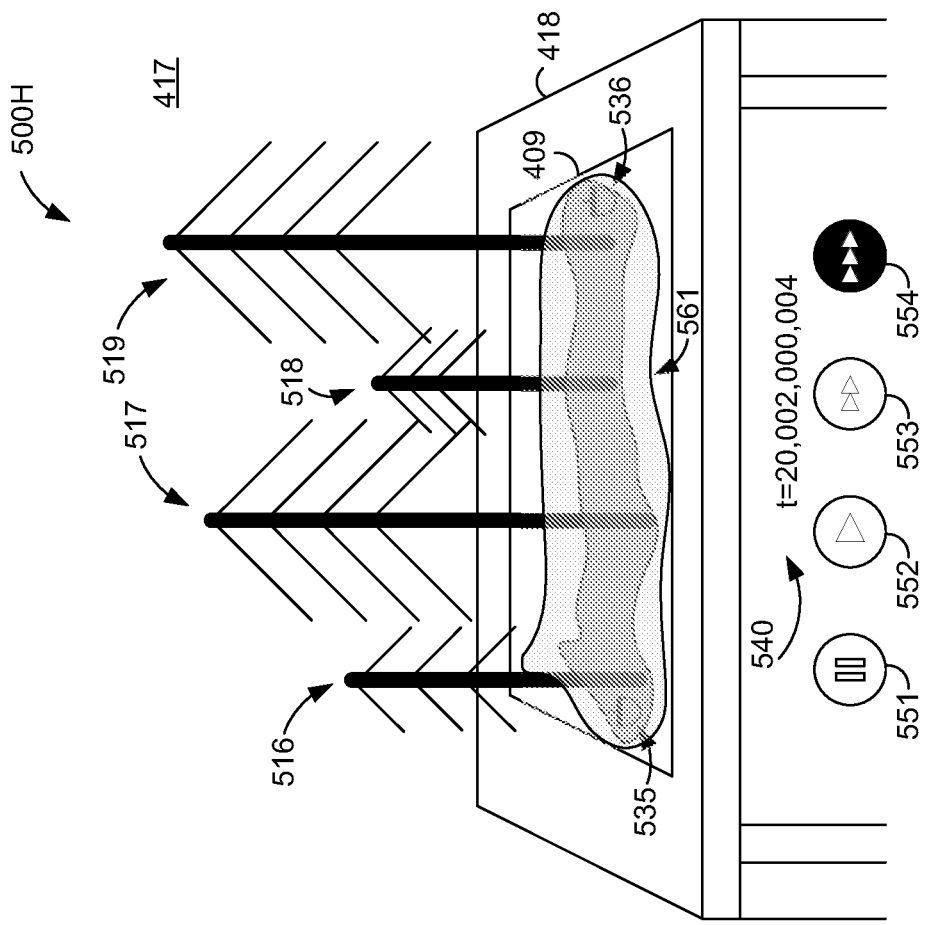

COMPUTATIONALLY EFFICIENT MODEL SELECTION

CROSS-REFERENCES TO RELATED APPLICATIONS

This application is a continuation of Intl. Patent App. No. PCT/US2019/052587, filed on Sep. 24, 2019, which claims priority to U.S. Provisional Patent App. No. 62/738,066, filed on Sep. 28, 2019, which are both hereby incorporated by reference in their entirety.

TECHNICAL FIELD

The present disclosure generally relates to generating an extended reality (XR) environment, and in particular, to systems, methods, and devices for determining environment states for an XR environment in a computationally efficient manner.

BACKGROUND

To present an XR environment that includes assets that evolve over time according to one or more models, extensive computation may be needed.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 illustrates a scene with an electronic device surveying the scene.

FIGS. 5A-5I illustrates a portion of the display of the electronic device of FIG. 4 displaying images of a representation of the scene including an XR environment.

Figure 1:
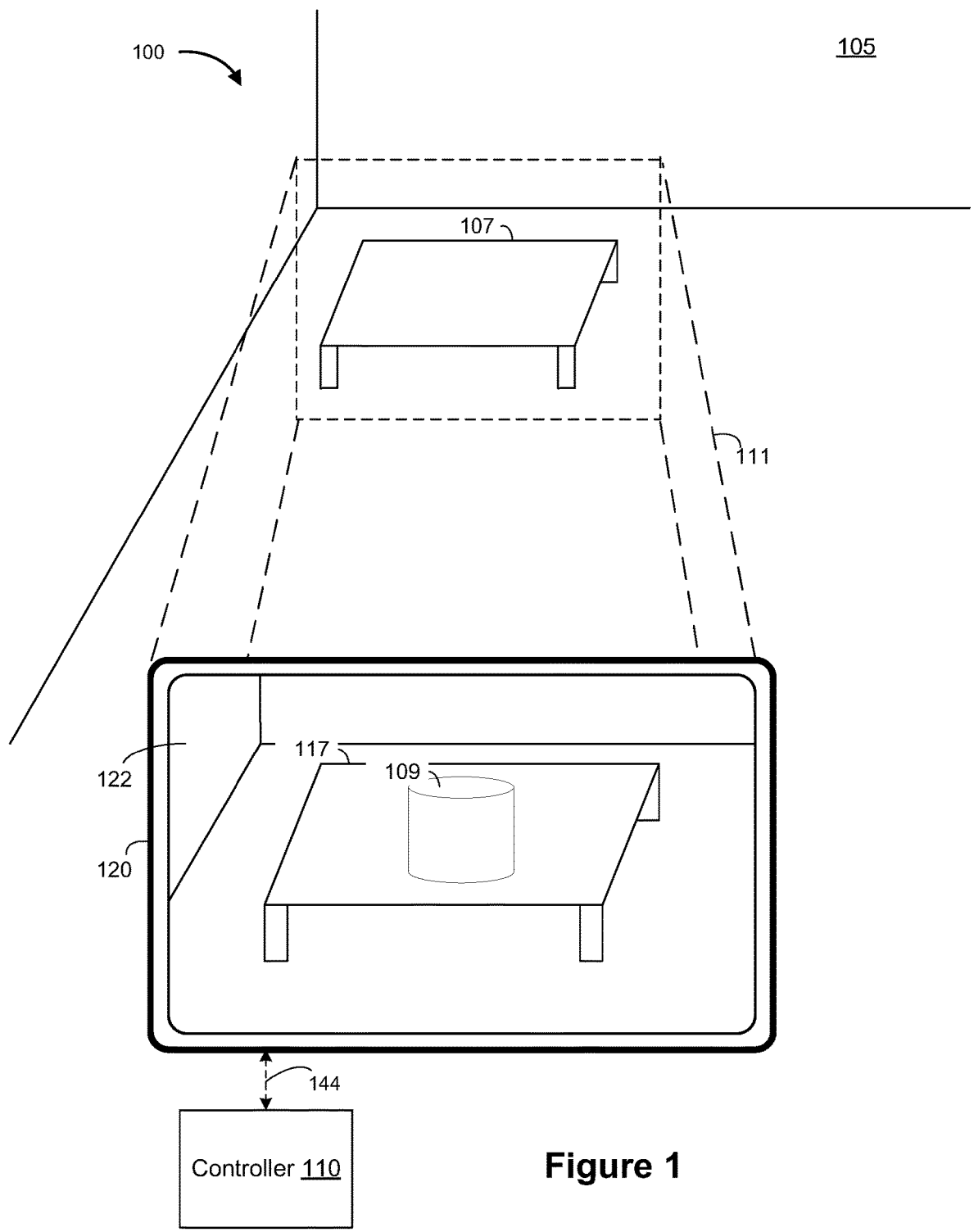
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating environment states of an environment. In various implementations, the method is performed at a device including one or more processors and non-transitory memory. The method includes obtaining a first environment state, associated with a first environment time, of an environment, wherein the first environment state indicates inclusion in the environment of one or more assets and further indicates one or more states of the one or more assets. The method includes determining, according to a first model and based on the first environment state, a second environment state associated with a second environment time. The method includes receiving an input indicative of a timestep from the second environment time to a third environment time, wherein the timestep is different than a difference between the first environment time and the second environment time. The method includes determining, according to a second model, different than the first model, and based on the second environment state, a third environment state associated with the third environment time.

Various implementations disclosed herein include devices, systems, and methods for generating an environment state of an environment according to a selected model. In various implementations, the method is performed at a device including one or more processors and non-transitory memory. The method includes obtaining a first environment state, associated with a first environment time, of an environment, wherein the first environment state indicates inclusion in the environment of one or more assets and further indicates one or more states of the one or more assets. The method includes determining a timestep from the first environment time to a second environment time. The method includes selecting, based on the timestep, a model from a plurality of different models. The method includes determining, in accordance with the selected model, a second environment state, associated with the second environment time, of the XR environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a device surveys a scene and presents, within the scene, an XR environment including one or more assets that evolve over time (e.g., change location or age). Modeling such an XR environment at various timescales can be computationally intensive, particularly when modeling the XR environment over larger timescales. Accordingly, in various implementations, different models are used to determine the environment state of the XR environment when presenting the XR environment at different timescales.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
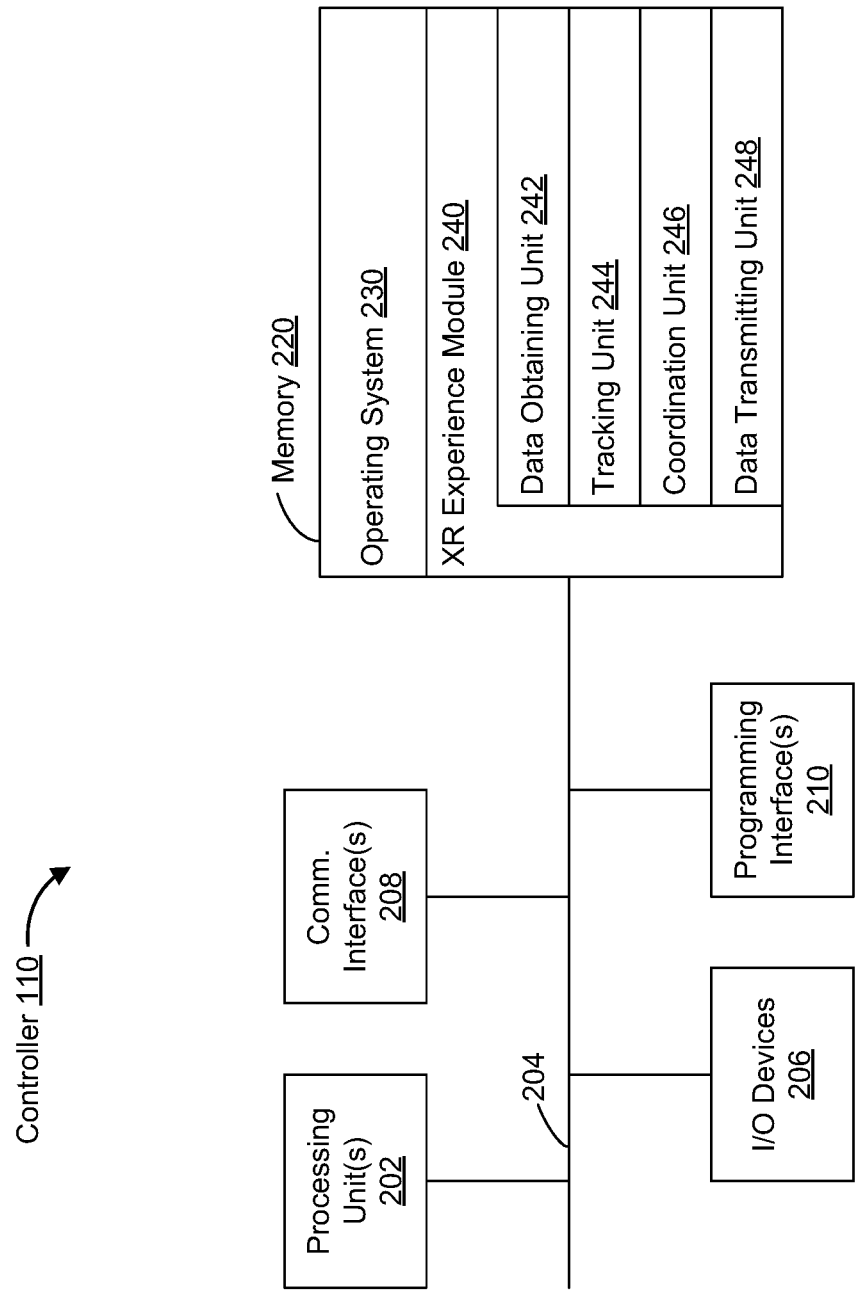
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
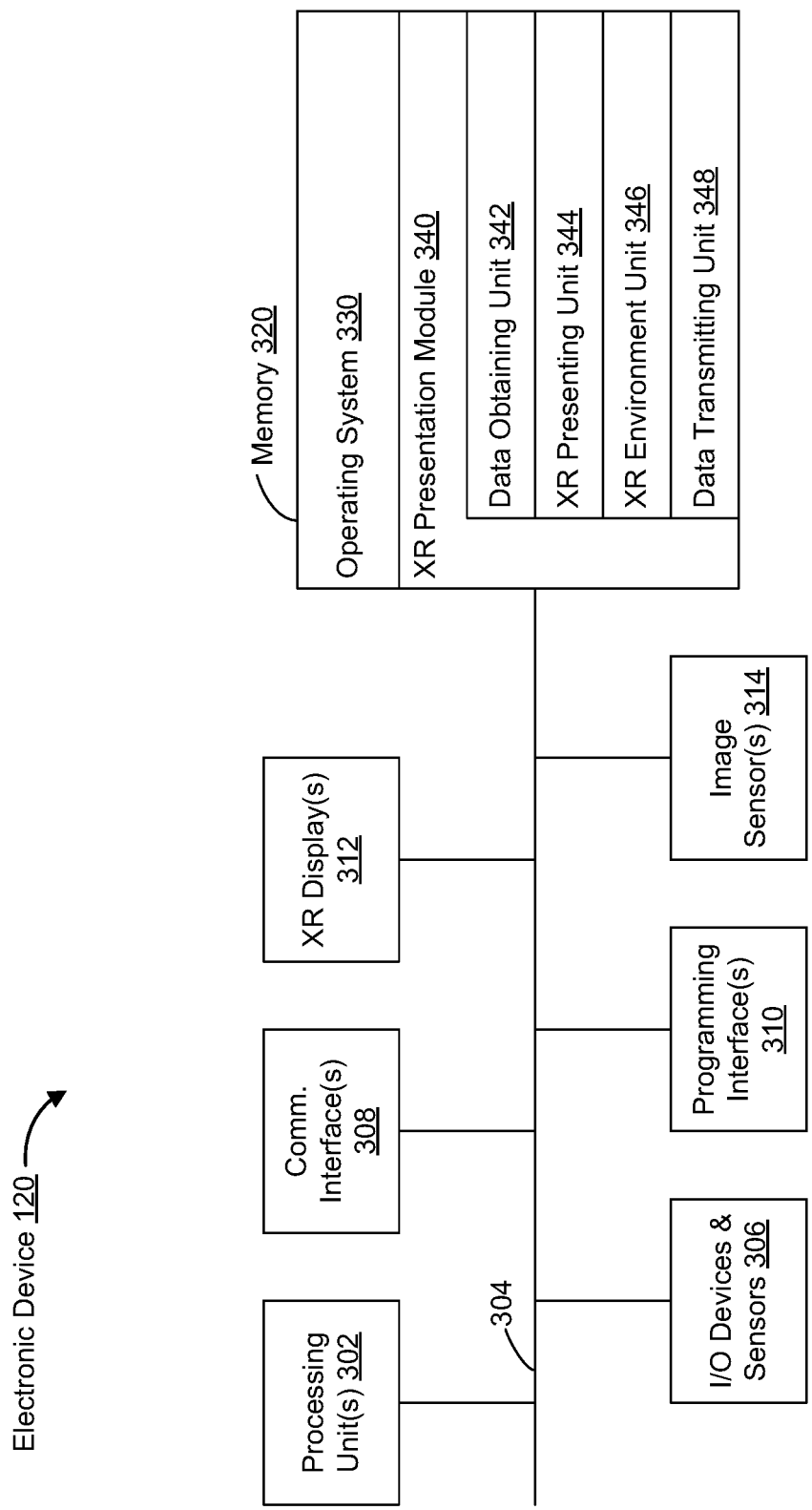
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an XR presenting unit 344, an XR environment unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the XR presenting unit 344 is configured to present XR content via the one or more XR displays 312. To that end, in various implementations, the XR presenting unit 344 includes instructions and/or logic therefor, and heuristics and metadata therefor.

In some implementations, the XR environment unit 346 is configured to generate one or more environment states of an XR environment. To that end, in various implementations, the XR environment unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit the request for a content rendering. To that end, in various implementations, the data transmitting unit 348 includes instructions and/or logic therefor, and heuristics and metadata therefor.

Although the data obtaining unit 342, the XR presenting unit 344, the XR environment unit 346, and the data transmitting unit 348 are shown as residing on a single device (e.g., the electronic device 120), it should be understood that in other implementations, any combination of the data obtaining unit 342, the XR presenting unit 344, the XR environment unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 illustrates a scene 405 with an electronic device 410 surveying the scene 405. The scene 405 includes a table 408 and a wall 407.

The electronic device 410 displays, on a display, a representation of the scene 415 including a representation of the table 418 and a representation of the wall 417. In various implementations, the representation of the scene 415 is generated based on an image of the scene captured with a scene camera of the electronic device 410 having a field-of-view directed toward the scene 405. The representation of the scene 415 further includes an XR environment 409 displayed on the representation of the table 418.

As the electronic device 410 moves about the scene 405, the representation of the scene 415 changes in accordance with the change in perspective of the electronic device 410. Further, the XR environment 409 correspondingly changes in accordance with the change in perspective of the electronic device 410. Accordingly, as the electronic device 410 moves, the XR environment 409 appears in a fixed relationship with respect to the representation of the table 418.

Figure 5A:
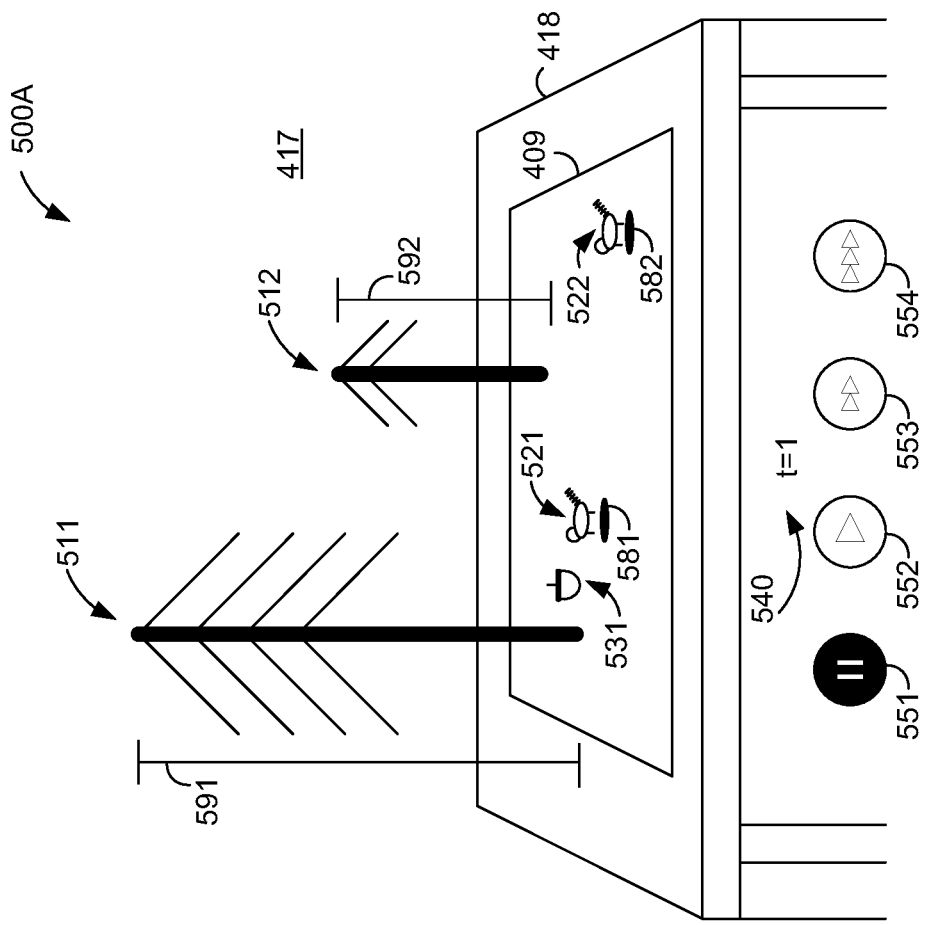

FIG. 5A illustrates a portion of the display of the electronic device 410 displaying a first image 500A of the representation of the scene 415 including the XR environment 409. In FIG. 5A, the XR environment 409 is defined by a first environment state and is associated with a first environment time (e.g., 1). The first environment state indicates the inclusion in the XR environment 409 of one or more assets and further indicates one or more states of the one or more assets. In various implementations, the environment state is a data object, such as an XML file.

Accordingly, the XR environment 409 displayed in the first image 500A includes a plurality of assets as defined by the first environment state. In FIG. 5A, the XR environment 409 includes a first tree 511 having a first height 591 and a second tree 512 having a second height 592. The XR environment 409 includes a first squirrel 521 at a first location 581 and a second squirrel 522 at a second location 582. The XR environment includes a first acorn 531.

The first environment state indicates the inclusion of the first tree 511 and defines one or more states of the first tree 511. For example, the first environment state indicates a first age of the first tree 511 and a first location of the first tree 511. The first environment state indicates the inclusion of the second tree 512 and defines one or more states of the second tree 512. For example, the first environment state indicates a first age of the second tree 512 and a first location of the second tree 512.

The first environment state indicates the inclusion of the first squirrel 521 and defines one or more states of the first squirrel 521. For example, the first environment state indicates a first age of the first squirrel 521, a first location of the first squirrel 521, and a first motion vector of the first squirrel 521 indicating that the first squirrel 521 is moving toward the first acorn 531. The first environment state indicates the inclusion of the second squirrel 522 and defines one or more states of the second squirrel 522. For example, the first environment state indicates a first age of the second squirrel 522, a first location of the second squirrel 522, and a first motion vector of the second squirrel 522 indicating the that second squirrel 522 is moving toward the second tree 512.

The first environment state indicates the inclusion of the first acorn 531 and defines one or more states of the first acorn 531. For example, the first environment state indicates a first location of the first acorn 531 and a first held state of the first acorn 531 indicating that the first acorn 531 is not held by a squirrel.

The first image 500A further includes a time indicator 540 and a plurality of timescale affordances 551-554. The plurality of timescale affordances 551-554 includes a pause affordance 551, a play affordance 552, a quick-play affordance 553, and a quicker-play affordance 554. In FIG. 5A, the time indicator 540 indicates a current time of the XR environment 409 of 1. Further, the pause affordance 551 is currently selected (as indicated by the different manner of display).

FIG. 5B illustrates a portion of the display of the electronic device 410 displaying a second image 500B of the representation of the scene 415 including the XR environment 409 in response to a user selection of the play affordance 552 and after a frame time (e.g., the inverse of the display frame rate). In FIG. 5B, the time indicator 540 indicates a current time of the XR environment 409 of 2 (e.g., a first timestep of 1 as compared to FIG. 5A). In FIG. 5B, the play affordance 552 is currently selected (as indicated by the different manner of display).

In FIG. 5B, the XR environment 409 is defined by a second environment state and is associated with a second environment time (e.g., 2). In various implementations, the second environment state is generated according to a first model and based on the first environment state.

In various implementations, determining the second environment state according to the first model includes determining a second age of the first tree 511 by adding the first timestep (e.g., 1) to the first age of the first tree 511, determining a second age of the second tree 512 by adding the first timestep to the first age of the second tree 512, determining a second age of the first squirrel 521 by adding the first timestep to the first age of the first squirrel 521, and determining a second age of the second squirrel 522 by adding the first timestep to the first age of the second squirrel 522.

In various implementations, determining the second environment state according to the first model includes determining a second location of the first tree 511 by copying the first location of the first tree 511 and determining a second first location of the second tree 512 by copying the first location of the second tree 512. Thus, the first model indicates that the first tree 511 and second tree 512 (e.g., assets having an asset type of "TREE") do not change location.

In various implementations, determining the second environment state according to the first model includes determining a second location of the first squirrel 521 by adjusting the first location of the first squirrel 521 according to the first motion vector of the first squirrel 521 and determining a second location of the second squirrel 522 by adjusting the first location of the second squirrel 522 according to the first motion vector of the second squirrel 522. Thus, the first model indicates that the first squirrel 521 and second squirrel 522 (e.g., assets having an asset type of "ANIMAL") change location according to a motion vector.

In various implementations, determining the second environment state according to the first model includes determining a second motion vector of the first squirrel 521 based on the proximity of other assets to the second location of the first squirrel 521 and determining a second motion vector of the second squirrel 522 based on the proximity of other assets to the second location of the second squirrel 522. For example, the first model indicates that the first squirrel 521 and second squirrel 522 (e.g., assets having an asset type of "ANIMAL" and an asset sub-type of "SQUIRREL") have motion vectors which direct them to nearby assets (e.g., trees, acorns, or other squirrels).

In various implementations, determining the second environment state includes determining a second location of the first acorn 531 based on the first location of the first acorn 531 and the first held state of the first acorn 531. For example, the first model indicates that the first acorn 531 (e.g., assets having an asset type of "ACORN") does not change location when the held state indicates that the first acorn 531 is not held, but changes in accordance with a change in location of an asset (e.g., a squirrel) that is holding the first acorn 531.

In various implementations, determining the second environment state includes determining a second held state of the first acorn 531 based on the second location of the first acorn 531 and the second location of the first squirrel 521 and the second location of the second squirrel 522. For example, the first model indicates that the first acorn 531 (e.g., assets having an asset type of "ACORN") changes its held state to indicate that it is being held by a particular asset having an asset type of "ANIMAL" and an asset sub-type of "SQUIRREL" when that particular asset is at the same location as the first acorn 531.

Accordingly, in FIG. 5B, as compared to FIG. 5A, the first squirrel 521 has moved to a third location 583 closer to the first acorn 531 and the second squirrel 522 has moved location closer to the second tree 512.

Figure 5C:
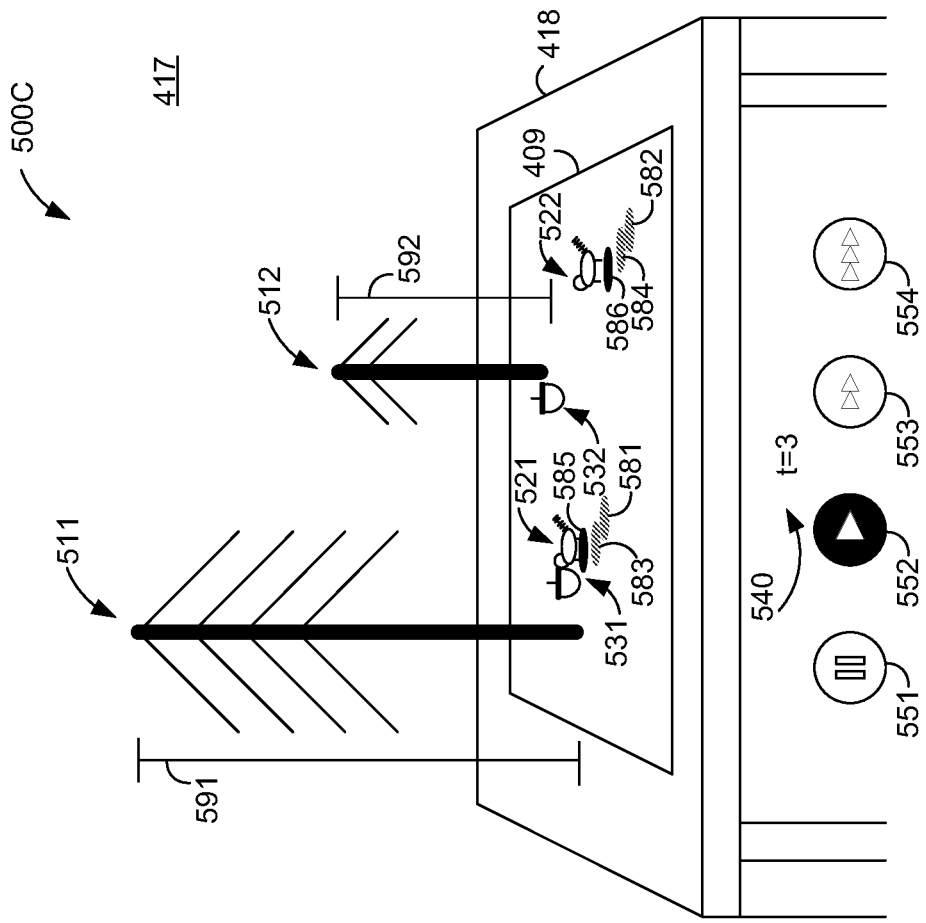

FIG. 5C illustrates a portion of the display of the electronic device 410 displaying a third image 500C of the representation of the scene 415 including the XR environment 409 after another frame time. In FIG. 5C, the time indicator 540 indicates a current time of the XR environment 409 of 3 (e.g., the first timestep of 1 as compared to FIG. 5B). In FIG. 5C, the play affordance 552 remains selected (as indicated by the different manner of display).

In FIG. 5C, the XR environment 409 is defined by a third environment state and is associated with a third environment time. In various implementations, the third environment state is generated according to the first model and based on the second environment state.

In various implementations, determining the third environment state according to the first model includes determining a third age of the first tree 511 by adding the first timestep (e.g., 1) to the second age of the first tree 511, determining a third age of the second tree 512 by adding the first timestep to the second age of the second tree 512, determining a third age of the first squirrel 521 by adding the first timestep to the second age of the first squirrel 521, and determining a third age of the second squirrel 522 by adding the first timestep to the second age of the second squirrel 522.

In various implementations, determining the third environment state according to the first model includes determining a second location of the first tree 511 by copying the second location of the first tree 511 and determining a third location of the second tree 512 by copying the second location of the second tree 512. Thus, the first model indicates that the first tree 511 and second tree 512 (e.g., assets having an asset type of "TREE") do not change location.

In various implementations, determining the third environment state according to the first model includes determining a third location of the first squirrel 521 by adjusting the second location of the first squirrel 521 according to the second motion vector of the first squirrel 521 and determining a third location of the second squirrel 522 by adjusting the second location of the second squirrel 522 according to the second motion vector of the second squirrel 522. Thus, the first model indicates that the first squirrel 521 and second squirrel 522 (e.g., assets having an asset type of "ANIMAL") change location according to a motion vector.

In various implementations, determining the third environment state according to the first model includes determining a third motion vector of the first squirrel 521 based on the proximity of other assets to the third location of the first squirrel 521 and determining a third motion vector of the second squirrel 522 based on the proximity of other assets to the third location of the second squirrel 522. For example, the first model indicates that the first squirrel 521 and second squirrel 522 (e.g., assets having an asset type of "ANIMAL" and an asset sub-type of "SQUIRREL") have motion vectors which direct them to nearby assets (e.g., trees, acorns, or other squirrels).

In various implementations, determining the third environment state includes determining a third location of the first acorn 531 based on the second location of the first acorn 531 and the second held state of the first acorn 531. For example, the first model indicates that the first acorn 531 (e.g., assets having an asset type of "ACORN") does not change location when the held state indicates that the first acorn 531 is not held, but changes in accordance with a change in location of an asset (e.g., a squirrel) that is holding the first acorn 531.

In various implementations, determining the third environment state includes determining a third held state of the first acorn 531 based on the third location of the first acorn 531 and the third location of the first squirrel 521 and the third location of the second squirrel 522. Thus, the first model indicates that the first acorn 531 (e.g., assets having an asset type of "ACORN") changes its held state to indicate that it is being held by a particular asset having an asset type of "ANIMAL" and an asset sub-type of "SQUIRREL" when that particular asset is at the same location as the first acorn 531.

In various implementations, determining the third environment state includes determining that an asset spawns a new asset. For example, in various implementations, the first model indicates that assets having an asset type of "TREE" have a probability (which may be based on the current age of the asset) of spawning an asset having an asset type of "ACORN".

In various implementations, determining the third environment state includes determining that an asset expires. For example, in various implementations, the first model indicates that assets having an asset type of "SQUIRREL" expire when the age of the asset reaches a threshold. As another example, in various implementations, the first model indicates that assets having an asset type of "TREE" have a probability (which may be based on the current age of the asset) of expiring.

In FIG. 5C, as compared to FIG. 5B, the first squirrel 521 has moved location to a fifth location 585 of the first acorn 531 and the second squirrel 522 has moved to a sixth location even closer to the second tree 512. Further the XR environment 409 includes a new asset, a second acorn 532, generated by the second tree 512.

Figure 5D:
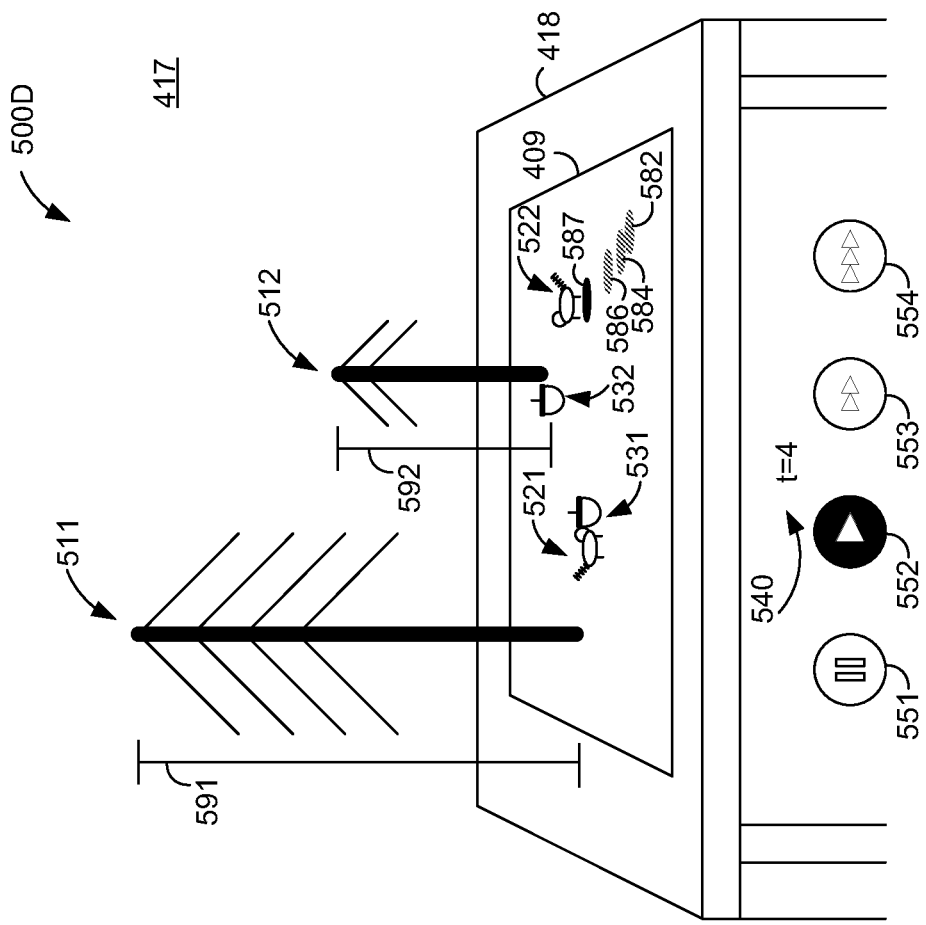

FIG. 5D illustrates a portion of the display of the electronic device 410 displaying a fourth image 500D of the representation of the scene 415 including the XR environment 409 after another frame time. In FIG. 5D, the time indicator 540 indicates a current time of the XR environment 409 of 4 (e.g., a timestep of 1 as compared to FIG. 5C). In FIG. 5D, the play affordance 552 remains selected (as indicated by the different manner of display).

In FIG. 5D, the XR environment 409 is defined by a fourth environment state and is associated with a fourth environment time. In various implementations, the fourth environment state is generated according to the first model and based on the third environment state. In various implementations, determining the fourth environment state according to the first model and based on the third environment state is performed as described above with respect to determining the third environment state according to the first model and based on the second environment state.

In FIG. 5D, as compared to FIG. 5C, the first squirrel 521 (holding the first acorn 531) has moved location further from the first tree 511 and the second squirrel 522 has moved to a seventh location 587 closer to the second acorn 532.

FIG. 5E illustrates a portion of the display of the electronic device 410 displaying a fifth image 500E of the representation of the scene 415 including the XR environment 409 in response to a user selection of the quick-play affordance 553 and after a frame time. In FIG. 5E, the time indicator 540 indicates a current time of the XR environment 409 of 1,000,004 (e.g., a second timestep of 1,000,000 as compared to FIG. 5D). In FIG. 5E, the quick-play affordance 553 is currently selected (as indicated by the different manner of display).

In FIG. 5E, the XR environment 409 is defined by a fifth environment state and is associated with a fifth environment time. In various implementations, because the second timestep between the fourth environment time and the fifth environment time is so much larger than the first timestep between, e.g., the first environment time and the second environment time, the fifth environment state is generated according to a second model, different than the first model, and based on the fourth environment state.

In particular, rather than determining the fifth environment state according to the application of the first model one million times, the fifth environment state is generated according to the application of the second model once.

In various implementations, the second model is more computationally efficient than the first model. After such a long period of time, certain states of certain assets of the fourth environment state may not be useful in determining the corresponding states of the fifth environment state. For example, whereas the location of the first squirrel 521 in the first environment state is used in the first model to determine the location of the first squirrel 521 in the second environment state, the location of the first squirrel 521 in the fourth environment state is not used to determine the location of the first squirrel 521 in the fifth environment state and, therefore, the second model is more computationally efficient than the first model.

In various implementations, determining the fifth environment state according to the second model includes determining a fifth age of the first tree 511 by adding the second timestep (e.g., 1,000,000) to the fourth age of the first tree 511, determining a fifth age of the second tree 512 by adding the second timestep to the fourth age of the second tree 512, determining a fifth age of the first squirrel 521 by adding the second timestep to the fourth age of the first squirrel 521, and determining a fifth age of the second squirrel 522 by adding the second timestep to the fourth age of the second squirrel 522.

In various implementations, determining the fifth environment state according to the second model includes determining a fifth location of the first tree 511 by copying the fourth location of the first tree 511 and determining a fifth location of the second tree 512 by copying the fourth location of the second tree 512. Thus, the second model indicates that the first tree 511 and second tree 512 (e.g., assets having an asset type of "TREE") do not change location.

In various implementations, determining the fifth environment state according to the second model includes determining a fifth location of the first squirrel 521 and determining a fifth location of the second squirrel 522. Whereas, according to the first model, the fifth location of the first squirrel 521 and the fifth location of the second squirrel 522 are determined based on their respective fourth locations and fourth motion vectors, in various implementations, the fifth location of the first squirrel 521 and the fifth location of the second squirrel 522 are determined independent of their respective fourth locations and fourth motion vectors. For example, in various implementations, determining the fifth location of the first squirrel 521 and determining the fifth location of the second squirrel 522 includes randomly selecting locations of the XR environment. In some embodiments, the respective fifth locations are selected based on a uniform distribution over the XR environment. In some embodiments, the respective fifth locations are selected based on a probability distribution (which may be based on the presence of other assets). For example, in some embodiments, the first squirrel 521 and second squirrel 522 are more likely to be located closer to other assets.

As noted above, in various implementations, determining an environment state according to the first model includes determining motion vectors of the first squirrel 521 and the second squirrel 522. However, as also noted above, in various implementations, the locations of the first squirrel 521 and the second squirrel 522 are determined independent of their respective motion vectors. Thus, in various implementations, determining the fifth environment state does not include determining motion vectors of the first squirrel 521 and the second squirrel 522. In various implementations, determining the fifth environment state includes determining the motion vectors as dummy or default values. Thus, in various implementations, determining the fifth environment state includes determining the motion vectors independent of the proximity of other assets to the location of the squirrels.

As noted above, in various implementations, determining an environment state according to the first model includes determining the location and/or held state of an asset having an asset type of "ACORN." In contrast, in various implementations, determining the fifth environment state according to the second model includes removing assets of the asset type "ACORN" and potentially replacing them with new assets of the asset type "ACORN" based on the number of assets having the asset type of "TREE" (and their respective probabilities of spawning an asset having an asset type of "ACORN").

Thus, in FIG. 5E, as compared to FIG. 5D, the first squirrel 521 and the second squirrel 522 have completely changed location, the second tree 512 has grown taller to a third height 593, the first acorn 531 and second acorn 532 have disappeared, and a third acorn 533 has appeared.

FIG. 5F illustrates a portion of the display of the electronic device 410 displaying a sixth image 500F of the representation of the scene 415 including the XR environment 409 after another frame time. In FIG. 5F, the time indicator 540 indicates a current time of the XR environment 409 of 2,000,004 (e.g., a timestep of 1,000,000 as compared to FIG. 5E). In FIG. 5F, the quick-play affordance 553 remains selected (as indicated by the different manner of display).

In FIG. 5F, the XR environment 409 is defined by a sixth environment state and is associated with a sixth environment time. In various implementations, the sixth environment state is generated according to the second model and based on the fifth environment state. In various implementations, determining the sixth environment state according to the second model and based on the fifth environment state is performed as described above with respect to determining the fifth environment state according to the second model and based on the fourth environment state.

In FIG. 5F, as compared to FIG. 5E, the first squirrel 521 and second squirrel have completely changed location again, the second tree 512 has again grown taller to a fourth height 594, and a third acorn 533 has disappeared.

Figure 5G:
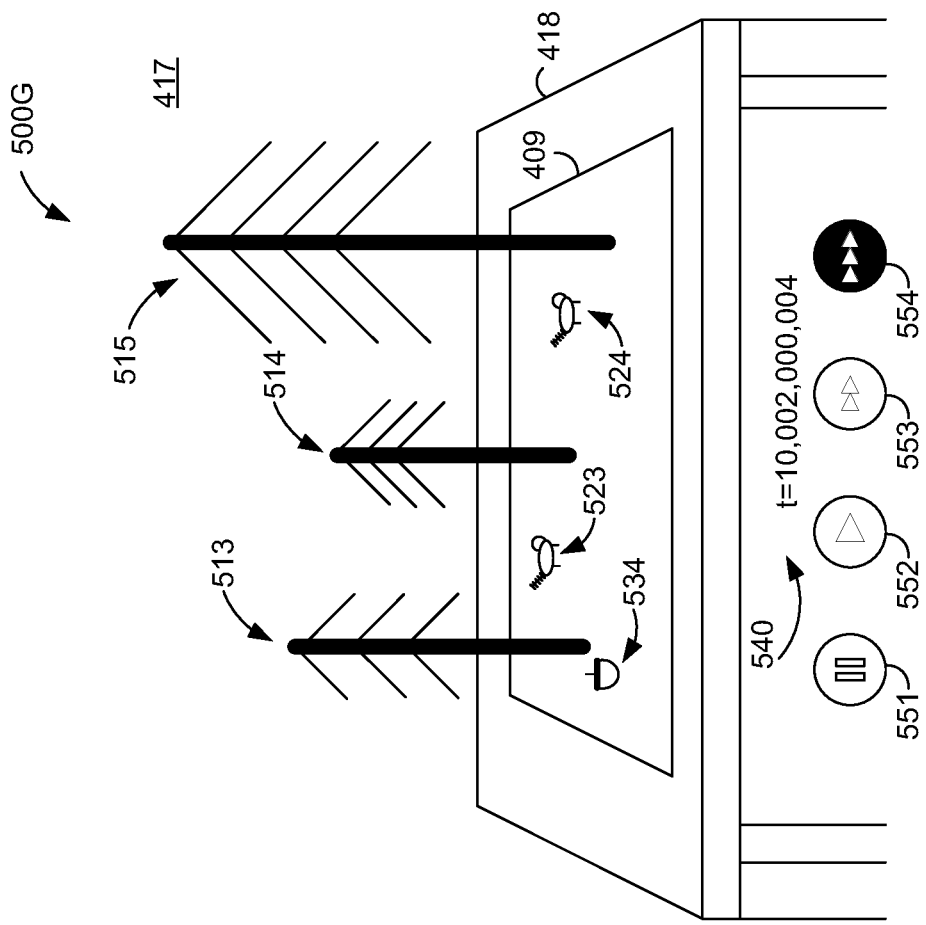

FIG. 5G illustrates a portion of the display of the electronic device 410 displaying a seventh image 500G of the representation of the scene 415 including the XR environment 409 in response to a user selection of the quicker-play affordance 553 after a frame time. In FIG. 5G, the time indicator 540 indicates a current time of the XR environment 409 of 10,002,000,004 (e.g., a third timestep of 10,000,000, 000 as compared to FIG. 5F). In FIG. 5G, the quicker-play affordance 554 is currently selected (as indicated by the different manner of display).

In FIG. 5G, the XR environment 409 is defined by a seventh environment state and is associated with a seventh environment time. In various implementations, because the third timestep between the sixth environment time and the seventh environment time is so much larger than the second timestep between, e.g., the fourth environment time and the fifth environment time, the seventh environment state is generated according to a third model, different than the second model, and based on the sixth environment state.

In particular, rather than determining the seventh environment state according to the application of the first model ten billion times (or the second model ten thousand times), the fifth environment state is generated according to the application of the third model once.

In various implementations, the third model is more computationally efficient than the second model. After such a long period of time, certain states of certain assets of the sixth environment state may not be useful in determining the fifth environment state. For example, whereas the age of the second tree 512 in the fourth environment state is used in the second model to determine the age of the second tree 512 in the fifth environment state, the age and location of all assets is not used by the third model. Rather, based on the number of trees, acorns, and squirrels, the third model generates new assets based an expected number of trees, acorns, and squirrels at the seventh environment time and distributes them randomly in location and age.

In FIG. 5G, as compared to FIG. 5F, the first squirrel 521 and second squirrel 522 have been replaced by a third squirrel 523 and a fourth squirrel 524; the first tree 511 and second tree 512 have been replaced by a third tree 513, a fourth tree 514, and a fifth tree 515; and a fourth acorn 534 has appeared.

FIG. 5H illustrates a portion of the display of the electronic device 410 displaying an eight image 500H of the representation of the scene 415 including the XR environment 409 after another frame time. In FIG. 5H, the time indicator 540 indicates a current time of the XR environment 409 of 20,002,000,004 (e.g., a third timestep of 10,000,000, 000 as compared to FIG. 5G). In FIG. 5H, the quicker-play affordance 554 remains selected (as indicated by the different manner of display).

In FIG. 5H, the XR environment 409 is defined by an eighth environment state and is associated with an eighth environment time. In various implementations, the eighth environment state is generated according to the third model and based on the seventh environment state. In various implementations, determining the eighth environment state according to the third model and based on the seventh environment state is performed as described above with respect to determining the seventh environment state according to the third model and based on the sixth environment state.

In FIG. 5H, as compared to FIG. 5G, the third squirrel 523 and fourth squirrel 524 have been replaced by a fifth squirrel 525, a sixth squirrel 526, and a seventh squirrel 527; the third tree 513, the fourth tree 514, and the fifth tree 515 have been replaced by a sixth tree 516, a seventh tree 517, an eighth tree 518, and a ninth tree 519; and the fourth acorn 534 has been replaced with a fifth acorn 535 and a sixth acorn 536.

In various implementations, based on the number of trees, acorns, and squirrels, rather than generating new assets based on an expected number of trees, acorns, and squirrels at an environment time, the third model generates an asset distribution indicating a likelihood of an asset being present at each location at the environment time. Displaying the asset distribution, e.g., as a cloud, represents a population density of the asset type at the environment time.

FIG. 5I illustrates a portion of the display of the electronic device 410 displaying a ninth image 500I of the representation of the scene 415 including the XR environment 409 with an asset distribution. In FIG. 5I, the time indicator 540 indicates a current time of the XR environment 409 of 20,002,000,004 (e.g., a third timestep of 10,000,000,000 as compared to FIG. 5G). In FIG. 5I, the quicker-play affordance 554 remains selected (as indicated by the different manner of display).

In FIG. 5I, as compared to FIG. 5H, the fifth squirrel 525, the sixth squirrel 526, and the seventh squirrel 527 are not displayed. Rather, a squirrel distribution 561 is displayed indicating the likelihood of a squirrel being present at respective locations at the eighth environment time.

Figure 6:
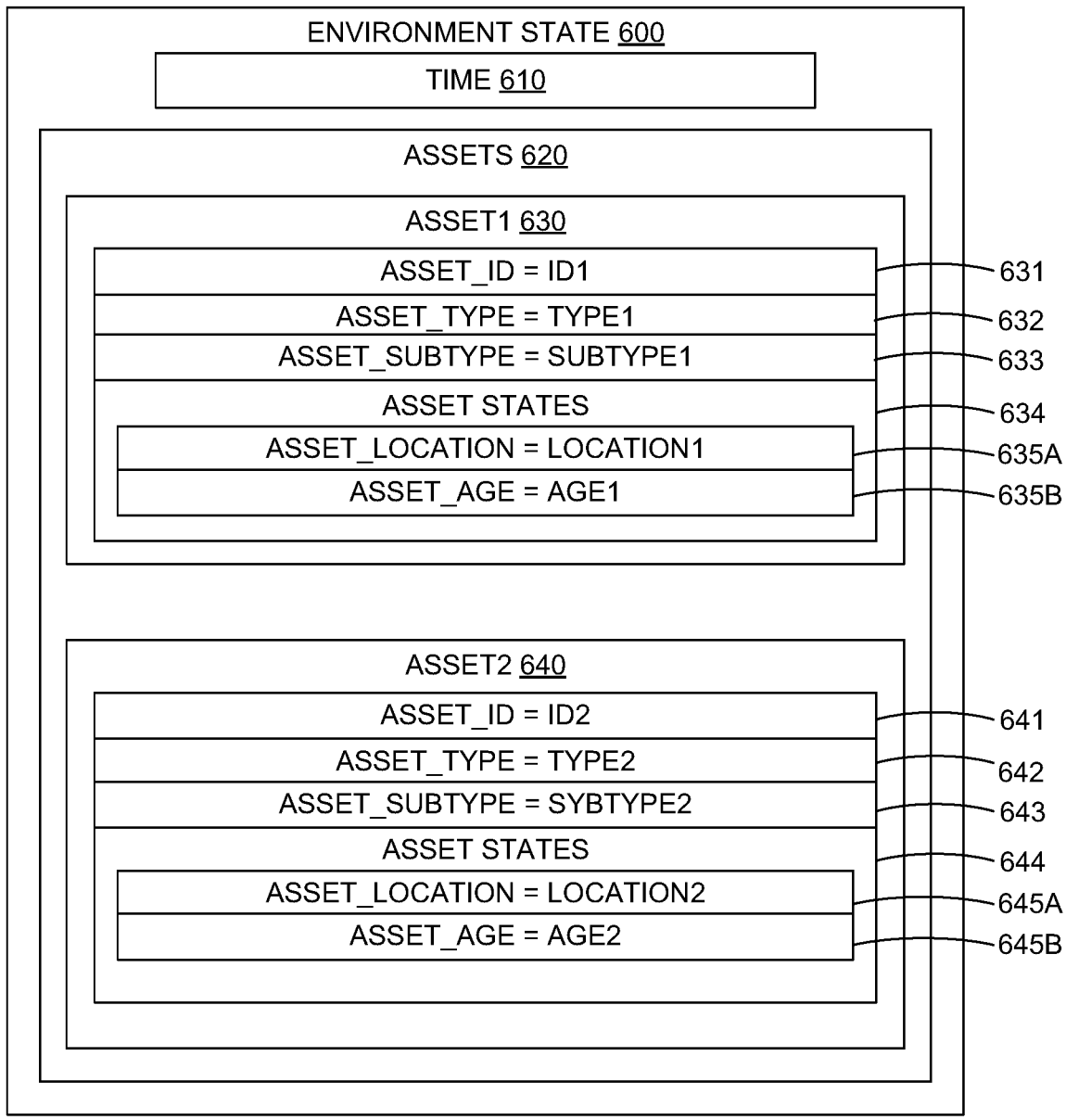
FIG. 6 illustrates an environment state in accordance with some implementations.

FIG. 6 illustrates an environment state 600 in accordance with some implementations. In various implementations, the environment state 600 is a data object, such as an XML file. The environment state 600 indicates inclusion in an XR environment of one or more assets and further indicates one or more states of the one or more assets.

The environment state 600 includes a time field 610 that indicates an environment time associated with the environment state.

The environment state 600 includes an assets field 620 including a plurality of individual asset fields 630 and 640 associated with respective assets of the XR environment. Although FIG. 6 illustrates only two assets, it is to be appreciated that the assets field 620 can include any number of asset fields.

The assets field 620 includes a first asset field 630. The first asset field 630 includes a first asset identifier field 631 that includes an asset identifier of the first asset. In various implementations, the asset identifier includes a unique number. In various implementations, the asset identifier includes a name of the asset.

The first asset field 630 includes a first asset type field 632 that includes data indicating an asset type of the first asset. The first asset field 630 includes an optional asset subtype field 633 that includes data indicating an asset subtype of the asset type of the first asset.

The first asset field 630 includes a first asset states field 634 including a plurality of first asset state fields 635A and 635B. In various implementations, the assets state field 634 is based on the asset type and/or asset subtype of the first asset. For example, when the asset type is "TREE", the asset states field 634 includes an asset location field 635A including data indicating a location in the XR environment of the asset and an asset age field 635B including data indicating an age of the asset. As another example, when the asset type is "ANIMAL", the asset states field 634 includes an asset motion vector field including data indicating a motion vector of the asset. As another example, when the asset type is "ACORN", the asset states field 634 includes an asset held state field including data indicating which, if any, other asset is holding the asset. As another example, when the asset type is "WEATHER", the asset states field 634 includes an asset temperature field including data indicating a temperature of the XR environment, an asset humidity field including data indicating a humidity of the XR environment, and/or an asset precipitation field including data indicating a precipitation condition of the XR environment.

The assets field 620 includes a second asset field 640. The second asset field 640 includes a second asset identifier field 640 that includes an asset identifier of the second asset. The second asset field 630 includes a second asset type field 642 that includes data indicating an asset type of the second asset. The second asset field 642 includes an optional asset subtype field 643 that includes data indicating an asset subtype of the asset type of the second asset.

The second asset field 640 includes a second asset states field 643 including a plurality of second asset state fields 645A and 645B. In various implementations, the assets state field 644 is based on the asset type and/or asset subtype of the second asset.

Figure 7:
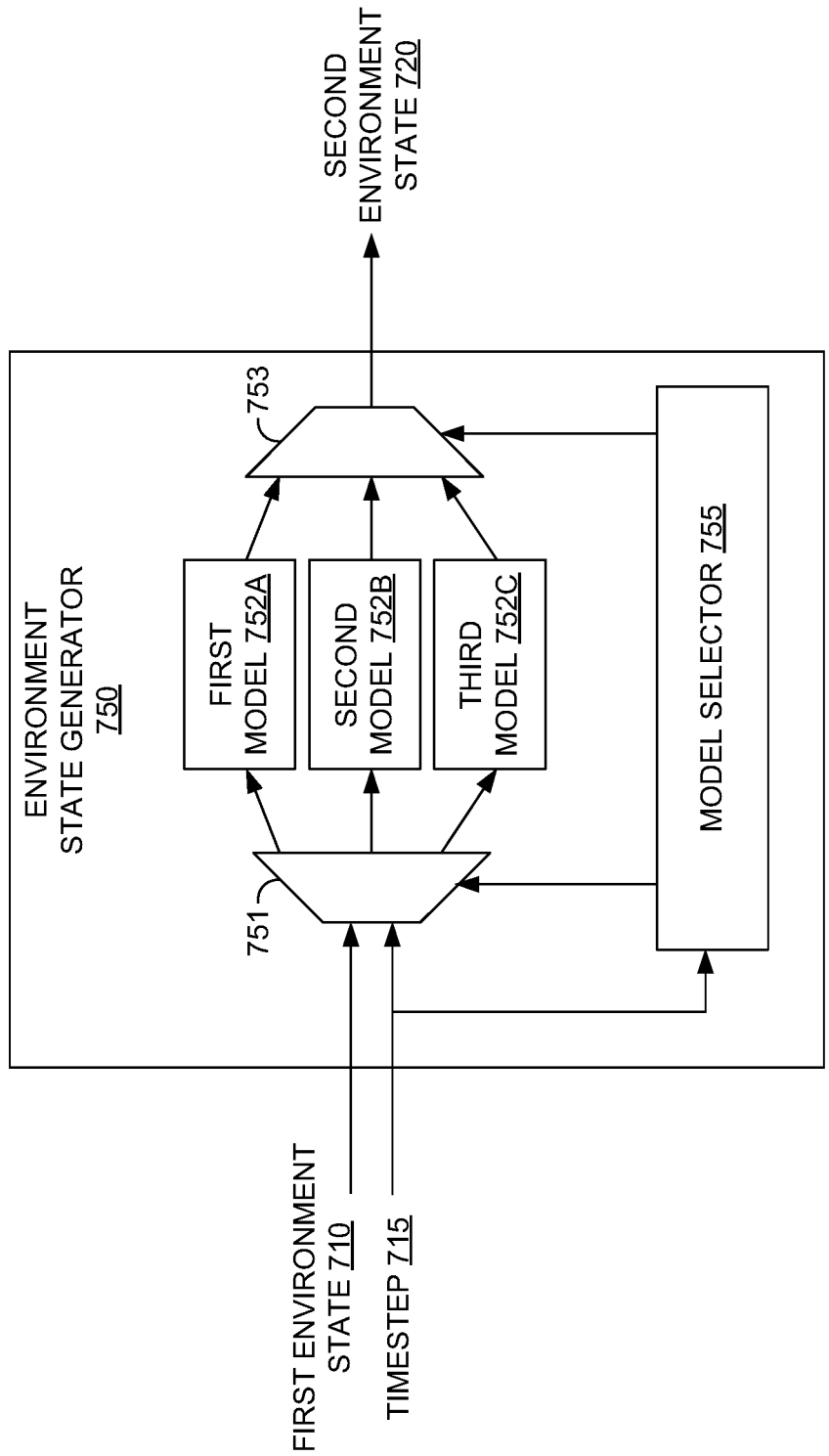
FIG. 7 illustrates a block diagram of an environment state generator in accordance with some implementations.

FIG. 7 illustrates a block diagram of an environment state generator 750 in accordance with some implementations. The environment state generator 750 receives, as an input, a first environment state 710 associated with a first environment time and a timestep 715. The environment state generator 750 generates, as an output, a second environment state 720 associated with a second environment time equal to the first environment time incremented by the timestep 715.

The environment state generator 750 includes a plurality of models 752A-752C including a first model 752A, a second model 752B, and a third model 752C connected in parallel between a multiplexer 751 and a demultiplexer 753. The environment state generator 750 includes a model selector 755 that controls the multiplexer 751 and the demultiplexer 753 based on the timestep 715.

When the timestep 715 is a first value (or within a first range of values), the model selector 755 controls the multiplexer 751 and the demultiplexer 753 to feed the first environment state 710 and timestep 715 to the first model 752A to generate the second environment state 720. When the timestep 715 is a second value (or within a second range of values), the model selector 755 controls the multiplexer 751 and the demultiplexer 753 to feed the first environment state 710 and the timestep 715 to the second model 752B to generate the second environment state 720. When the timestep 715 is a third value (or within a third range of values), the model selector 755 controls the multiplexer 751 and the demultiplexer 753 to feed the first environment state 710 and the timestep 715 to the third model 752C to generate the second environment state 720.

Accordingly, each model 752A-752C, when selected by the model selector 755, receives the first environment state 710 and the timestep 715 and generates the second environment state 720. In various implementations, each model 752A-752C includes respective heuristics and metadata used to generate the second environment state 720.

Figure 8:
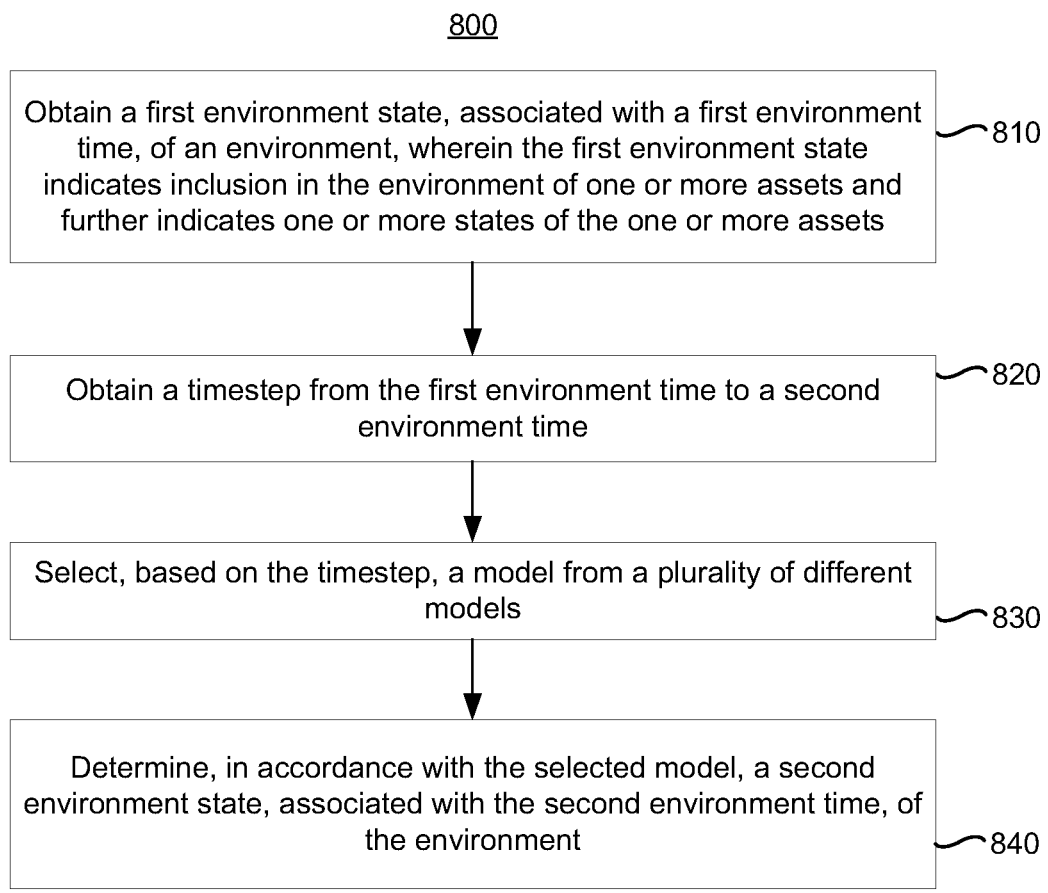
FIG. 8 is a flowchart representation of a method of generating an environment state of an XR environment in accordance with some implementations.

FIG. 8 is a flowchart representation of a method 800 of generating an environment state of an environment in accordance with some implementations. In various implementations, the method 800 is performed by a device with one or more processors, non-transitory memory, and a camera (e.g., the electronic device 120 of FIG. 3 or the electronic device 410 of FIG. 4). In some implementations, the method 800 is performed by processing logic, including hardware, firmware, software, or a combination thereof (e.g., the environment state generator 750 of FIG. 7). In some implementations, the method 800 is performed by a processor executing instructions (e.g., code) stored in a non-transitory computer-readable medium (e.g., a memory). Briefly, in some circumstances, the method 800 includes obtaining a first environment state, associated with a first environment time, of an environment and a timestep, selecting a model from a plurality of models based on the timestep, and applying the selected model to the first environment state to generate a second environment state associated with a second environment time.

The method 800 begins, in block 810, with the device obtaining a first environment state, associated with a first environment time, of an environment, wherein the first environment state indicates inclusion in the environment of one or more assets and further indicates one or more states of the one or more assets. In various implementations, the method 800 includes displaying the environment having the first environment state at a first time (e.g., a first real time).

In various implementations, the environment state is a data object, such as an XML file. In various implementations, the first environment state is manually programmed In various implementations, the first environment state is generated by applying a model to a previous environment state.

The method 800 continues, at block 820, with the device obtaining a timestep from the first environment time to a second environment time. In various implementations, the timestep is manually programmed In various implementations, the timestep is determined based on user interaction with one or more timescale affordances respectively associated with one or more timesteps.

The method 800 continues, at block 830, with the device selecting, based on the timestep, a model from a plurality of different models. In various implementations, in response to obtaining a timestep having a first value (or within a first range of values), the device selects a first model and, in response to obtaining a timestep having a second value (or within a second range of values), the device selects a second model different from the first model. In various implementations, the second model is more computationally efficient than the first model.

The method 800 continues, at block 840, with the device determining, in accordance with the selected model, a second environment state, associated with the second environment time, of the environment. In various implementations, the method 800 includes displaying the environment having the second environment state at a second time (e.g., a second real time).

In various implementations, determining the second environment state in accordance with the selected model (at block 840) includes, in accordance with a selection (at block 830) of a first model, determining a second value of an asset state of the second environment state based on a first value of the asset state of the first environment state. For example, as described above with respect to FIG. 5C, determining the third environment state includes determining a third location of the first squirrel 521 based on the second location of the first squirrel 521 and the second motion vector of the first squirrel 521. In various implementations, determining the second environment state in accordance with the selected model (at block 840) includes, in accordance with a selection (at block 830) of a second model, determining a second value of an asset state of the second environment state independent of the first value of the asset state of the first environment state. For example, as described above with respect to FIG. 5E, determining the fifth environment state includes determining a fifth location of the first squirrel 521 independent of the fourth location of the first squirrel 521 and the fourth motion vector of the first squirrel 521.

In various implementations, determining the second environment state in accordance with the selected model (at block 840) includes, in accordance with a selection (at block 830) of a first model, determining a second value of an asset state of the second environment state based on the first environment state. For example, as described above with respect to FIG. 5C, determining the third environment state includes determining a third motion vector of the first squirrel 521 based on the proximity of the third location of the first squirrel 521 to the third locations of other assets (which are based on their second locations of the second environment state). In various implementations, determining the second environment state in accordance with the selected model (at block 840) includes, in accordance with a selection (at block 830) of a second model, forgoing determining the second value of the asset state of the second environment state based on the first environment state. For example, as described above with respect to FIG. 5E, determining the fifth environment state does not include determining a fifth motion vector of the first squirrel 521.

In various implementations, determining the second environment state in accordance with the selected model (at block 840) includes, in accordance with a selection (at block 830) of a first model, determining a second value of an asset state of the second environment state based on a first value of the asset state of the first environment state. For example, as described above with respect to FIG. 5E, determining the fifth environment state includes determining a fifth location of the first tree 511 based on the fourth location of the first tree 511. In various implementations, determining the second environment state in accordance with the selected model (at block 840) includes, in accordance with a selection (at block 830) of a second model, excluding the asset having the asset state from the second environment state. For example, as described above with respect to FIG. 5G, determining the seventh environment state includes removing the first tree 511.

In various implementations, determining the second environment state in accordance with the selected model (at block 840) includes, in accordance with a selection (at block 830) of a second model, including one or more new assets having the same asset type as the asset having the asset state based on the number of assets having a respective asset type in the first environment state. For example, as described above with respect to FIG. 5G, determining the seventh environment state includes adding the third tree 513, the fourth tree 514, and the fifth tree 515 based on the number of trees (and the number of squirrels) in the sixth environment state. As another example, as described above with respect to FIG. 5E, determining the fifth environment state includes adding the third acorn 533 based on the number of trees in the fifth environment state.

Figure 9:
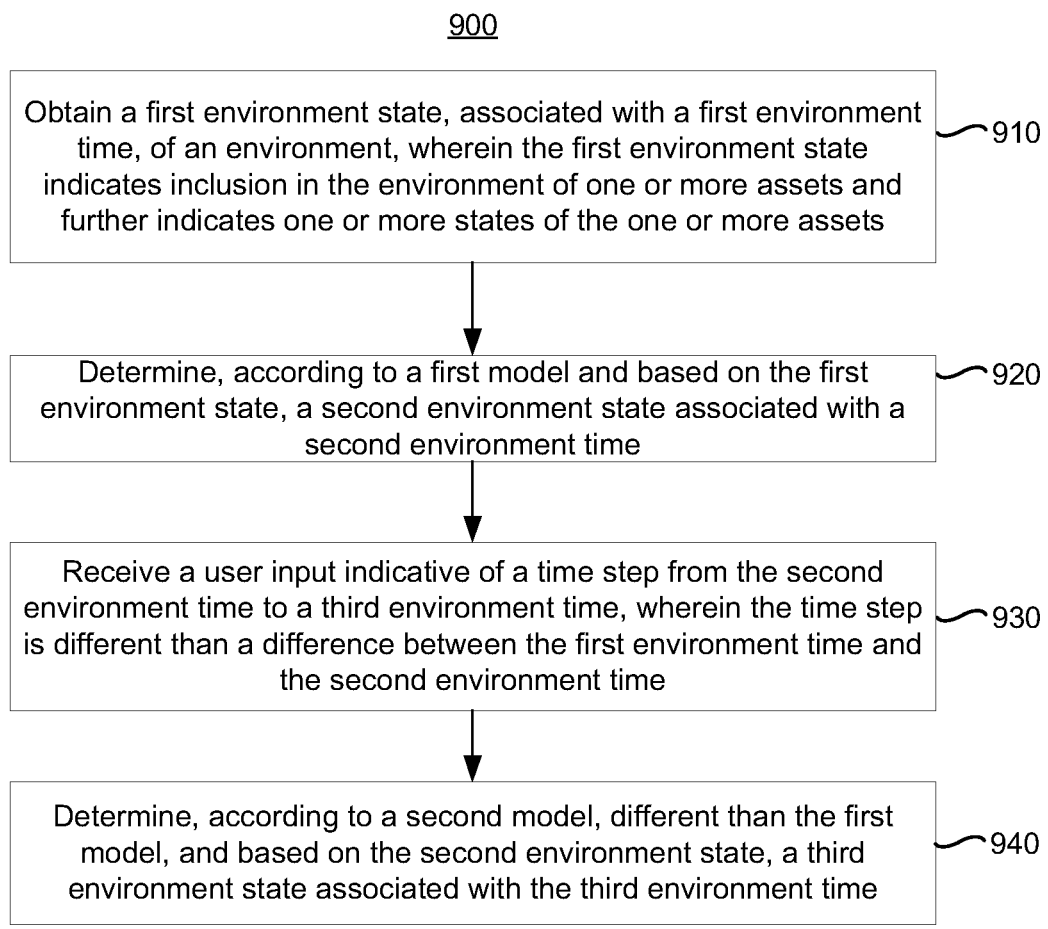
FIG. 9 is a flowchart representation of a method of generating environment states of an XR environment in accordance with some implementations.

FIG. 9 is a flowchart representation of a method 900 of generating environment states of an environment in accordance with some implementations. In various implementations, the method 900 is performed by a device with one or more processors, non-transitory memory, and a camera (e.g., the electronic device 120 of FIG. 3 or the electronic device 410 of FIG. 4). In some implementations, the method 900 is performed by processing logic, including hardware, firmware, software, or a combination thereof (e.g., the environment state generator 750 of FIG. 7). In some implementations, the method 900 is performed by a processor executing instructions (e.g., code) stored in a non-transitory computer-readable medium (e.g., a memory). Briefly, in some circumstances, the method 900 includes obtaining a first environment state, associated with a first environment time, of an XR environment and a timestep, selecting a model from a plurality of models based on the timestep, and applying the selected model to the first environment state to generate a second environment state associated with a second environment time.

The method 900 begins, in block 910, with the device obtaining a first environment state, associated with a first environment time, of an environment, wherein the first environment state indicates inclusion in the environment of one or more assets and further indicates one or more states of the one or more assets. For example, in various implementations, the first environment state includes data indicating the inclusion of a first asset of the one or more assets, a type of the first asset, a respective location of the first asset in the environment, and a respective age of the first asset. In various implementations, the method 900 includes displaying the environment having the first environment state at a first time.

In various implementations, the environment state is a data object, such as an XML file. In various implementations, the first environment state is manually programmed In various implementations, the first environment state is generated by applying a model to a previous environment state.

The method 900 continues, at block 920, with the device determining, according to a first model and based on the first environment state, a second environment state associated with a second environment time. In various implementations, the second environment state includes data indicating the inclusion of a first asset of the one or more assets, the type of the first asset, a respective location of the first asset in the environment, and a respective age of the first asset. In various implementations, the method 900 includes displaying the environment having the second environment state at a second time (e.g., a frame time later than the first time).

The method 900 continues, at block 930, with the device receiving an input indicative of a timestep from the second environment time to a third environment time, wherein the timestep is different than a difference between the first environment time and the second environment time. In various implementations, receiving the input indicative of the timestep includes receiving user input indicative of a selection of one of a plurality of timescale affordances respectively associated with a plurality of timesteps. For example, in FIG. 5E, the user has selected the quick-play affordance 553 and the timestep between FIG. 5D and FIG. 5E is different than the timestep between FIG. 5C and FIG. 5D.

The method 900 continues, at block 940, with the device determining, according to a second model, different than the first model, and based on the second environment state, a third environment state associated with the third environment time. In various implementations, the second model is more computationally efficient than the first model. In various implementations, the third environment state includes data indicating the inclusion of the first asset of the one or more assets, the type of the first asset, a respective location of the first asset in the environment, and a respective age of the first asset. In various implementations, the method 900 includes displaying the environment having the third environment state at a third time (e.g., the frame time later than the third time).

In various implementations, determining the second environment state in accordance with the first model (at block 920) includes, determining a second value of an asset state of the second environment state based on a first value of the asset state of the first environment state. For example, as described above with respect to FIG. 5C, determining the third environment state includes determining a third location of the first squirrel 521 based on the second location of the first squirrel 521 and the second motion vector of the first squirrel 521. In various implementations, determining the third environment state in accordance with the second model (at block 940) includes determining a third value of the asset state of the third environment state independent of the second value of the asset state of the second environment state. For example, as described above with respect to FIG. 5E, determining the fifth environment state includes determining a fifth location of the first squirrel 521 independent of the fourth location of the first squirrel 521 and the fourth motion vector of the first squirrel 521.

In various implementations, determining the second environment state in accordance with the first model (at block 920) includes determining a second value of an asset state of the second environment state based on the first environment state. For example, as described above with respect to FIG. 5C, determining the third environment state includes determining a third motion vector of the first squirrel 521 based on the proximity of the third location of the first squirrel 521 to the third locations of other assets (which are based on their second locations of the second environment state). In various implementations, determining the second environment state in accordance with the second model (at block 940) includes forgoing determining a third value of the asset state of the third environment state based on the second environment state. For example, as described above with respect to FIG. 5E, determining the fifth environment state does not include determining a fifth motion vector of the first squirrel 521.

In various implementations, determining the second environment state in accordance with the first model (at block 920) includes determining a second value of an asset state of the second environment state based on a first value of the asset state of the first environment state. For example, as described above with respect to FIG. 5E, determining the fifth environment state includes determining a fifth location of the first tree 511 based on the fourth location of the first tree 511. In various implementations, determining the third environment state in accordance with the second model (at block 940) includes excluding the asset having the asset state from the third environment state. For example, as described above with respect to FIG. 5G, determining the seventh environment state includes removing the first tree 511.

In various implementations, determining the third environment state in accordance with the second model (at block 940) includes including one or more new assets having the same asset type as the asset having the asset state based on the number of assets having a respective asset type in the second environment state. For example, as described above with respect to FIG. 5G, determining the seventh environment state includes adding the third tree 513, fourth tree 514, and fifth tree 515 based on the number of trees (and the number of squirrels) in the sixth environment state. As another example, as described above with respect to FIG. 5E, determining the fifth environment state includes adding the third acorn 533 based on the number of trees in the fifth environment state.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including a processor and non-transitory memory:
   obtaining a first environment state, associated with a first environment time, of an environment, wherein the first environment state indicates inclusion in the environment of one or more assets and further indicates one or more states of the one or more assets;
   determining, according to a first model and based on the first environment state, a second environment state associated with a second environment time;
   receiving an input indicative of a timestep from the second environment time to a third environment time, wherein the timestep is different than a difference between the first environment time and the second environment time;
   determining, according to a second model, different than the first model, and based on the second environment state, a third environment state associated with the third environment time.

2. The method of claim 1, wherein the first environment state includes an XML file.

3. The method of claim 1, wherein the first environment state, second environment state, and third environment state include data indicating:
   the inclusion of a first asset of the one or more assets;
   a type of the first asset;
   a respective location of the first asset in the environment; and
   a respective age of the first asset.

4. The method of claim 1, further comprising:
   displaying the environment having the first environment state at a first time;
   displaying the environment having the second environment state at a second time a frame time later than the first time; and
   displaying the environment having the third environment state at a third time the frame time later than the second time.

5. The method of claim 1, wherein receiving the input indicative of the timestep includes receiving user input indicative of a selection of one of a plurality of timescale affordances respectively associated with a plurality of timesteps.

6. The method of claim 1, wherein the second model is more computationally efficient than the first model.

7. The method of claim 1, wherein:
   determining, in accordance with the first model, the second environment state includes determining a second value of an asset state of the second environment state based on a first value of the asset state of the first environment state; and
   determining, in accordance with the second model, the third environment state includes determining a third value of the asset state of the third environment state independent of the second value of the asset state of the second environment state.

8. The method of claim 1, wherein:
   determining, in accordance with the first model, the second environment state includes determining a second value of an asset state of the second environment state based on the first environment state; and
   determining, in accordance with the second model, the third environment state includes forgoing determining a third value of the asset state of the third environment state based on the second environment state.

9. The method of claim 1, wherein:
   determining, in accordance with the first model, the second environment state includes determining a second value of an asset state of the second environment state based on a first value of the asset state of the first environment state; and
   determining, in accordance with the second model, the third environment state includes excluding the asset having the asset state from the third environment state.

10. The method of claim 9, wherein determining, in accordance with the second model, the third environment state includes including one or more new assets having the same asset type as the asset having the asset state based on a number of assets having a respective asset type in the second environment state.

11. The method of claim 1, wherein determining, in accordance with the second model, the third environment state includes determining a third value of an asset state of the third environment state by adding the timestep to a second value of the asset state of the second environment state.

12. A device comprising:
   a non-transitory memory; and
   one or more processors to:
      obtain a first environment state, associated with a first environment time, of an environment, wherein the first environment state indicates inclusion in the environment of one or more assets and further indicates one or more states of the one or more assets;
      determine, according to a first model and based on the first environment state, a second environment state associated with a second environment time;
      receive an input indicative of a timestep from the second environment time to a third environment time, wherein the timestep is different than a difference between the first environment time and the second environment time;
      determine, according to a second model, different than the first model, and based on the second environment state, a third environment state associated with the third environment time.

13. The device of claim 12, wherein the one or more processors are to receive the input indicative of the timestep by receiving user input indicative of a selection of one of a plurality of timescale affordances respectively associated with a plurality of timesteps.

14. The device of claim 12, wherein the second model is more computationally efficient than the first model.

15. The device of claim 12, wherein:
   the one or more processors are to determine, in accordance with the first model, the second environment state by determining a second value of an asset state of the second environment state based on a first value of the asset state of the first environment state; and
   the one or more processors are to determine, in accordance with the second model, the third environment state by determining a third value of the asset state of the third environment state independent of the second value of the asset state of the second environment state.

16. The device of claim 12, wherein:
   the one or more processors are to determine, in accordance with the first model, the second environment state by determining a second value of an asset state of the second environment state based on the first environment state; and
   the one or more processors are to determine, in accordance with the second model, the third environment state by forgoing determining a third value of the asset state of the third environment state based on the second environment state.

17. The device of claim 12, wherein:
   the one or more processors are to determine, in accordance with the first model, the second environment state by determining a second value of an asset state of the second environment state based on a first value of the asset state of the first environment state; and
   the one or more processors are to determine, in accordance with the second model, the third environment state by excluding the asset having the asset state from the third environment state.

18. The device of claim 17, wherein the one or more processors are to determine, in accordance with the second model, the third environment state by including one or more new assets having the same asset type as the asset having the asset state based on a number of assets having a respective asset type in the second environment state.

19. The device of claim 12, wherein the one or more processors are to determine, in accordance with the second model, the third environment state by determining a third value of an asset state of the third environment state by adding the timestep to a second value of the asset state of the second environment state.

20. A non-transitory memory storing one or more programs, which, when executed by one or more processors of a device, cause the device to:
- obtain a first environment state, associated with a first environment time, of an environment, wherein the first environment state indicates inclusion in the environment of one or more assets and further indicates one or more states of the one or more assets;
- determine, according to a first model and based on the first environment state, a second environment state associated with a second environment time;
- receive an input indicative of a timestep from the second environment time to a third environment time, wherein the timestep is different than a difference between the first environment time and the second environment time;
- determine, according to a second model, different than the first model, and based on the second environment state, a third environment state associated with the third environment time.

* * * * *